March 28, 1939.   B. D. BEDFORD   2,152,457
ELECTRIC CIRCUIT
Filed July 1, 1938    4 Sheets-Sheet 1

Inventor:
Burnice D. Bedford,
by Harry E. Dunham
His Attorney.

March 28, 1939.　　B. D. BEDFORD　　2,152,457
ELECTRIC CIRCUIT
Filed July 1, 1938　　4 Sheets-Sheet 2

Inventor:
Burnice D. Bedford,
by Harry E. Dunham
His Attorney.

Inventor:
Burnice D. Bedford,
by Harry E. Dunham
His Attorney.

March 28, 1939.  B. D. BEDFORD  2,152,457

ELECTRIC CIRCUIT

Filed July 1, 1938  4 Sheets-Sheet 4

Inventor:
Burnice D. Bedford,
by Harry E. Dunham
His Attorney.

Patented Mar. 28, 1939

2,152,457

UNITED STATES PATENT OFFICE 2,152,457

ELECTRIC CIRCUIT

Burnice D. Bedford, Schenectady, N. Y., assignor to General Electric Company, a corporation of New York Application July 1, 1938, Serial No. 216,988

32 Claims. (Cl. 171—97)

My invention relates to electric circuits and more particularly to electric circuits for effecting transformation of constant voltage alternating current into alternating current of constant value, or vice versa.

In many applications, it is desirable to effect transformation of electric power from constant voltage alternating current to alternating current of constant value. For example, in the electric power transmission and distribution system disclosed and claimed in United States Letters Patent No. 1,990,758 granted February 12, 1935, on an application of C. W. Stone, there is shown an arrangement which involves the transformation of constant voltage alternating current into alternating current of constant value. My invention described hereinafter may be applied to a system of the type disclosed in the above mentioned Stone patent. One of the principal arrangements used heretofore for transforming constant voltage alternating current into alternating current of constant value has been the networks comprising stationary impedance such as reactances of opposite sign, which may be inductances and capacitances. In accordance with the teachings of my invention described hereinafter, I provide new and improved systems whereby rotating electrical equipment may be employed to effect constant voltage-constant current alternating current transformation.

It is an object of my invention to provide new and improved circuits for transforming constant voltage alternating current into alternating current of constant value.

It is another object of my invention to provide new and improved electric circuits employing dynamo-electric machines which simulate in their action monocyclic networks.

It is a further object of my invention to provide new and improved arrangements comprising alternating current dynamo electric machines of the synchronous type for transforming constant voltage alternating current into alternating current of constant value.

It is a still further object of my invention to provide new and improved electric circuits which are used in conjunction with monocyclic networks to supplement the action of the monocyclic networks in the transformation of constant voltage alternating current into alternating current of constant value.

In accordance with the illustrated embodiments of my invention, I provide new and improved electric circuits comprising a pair of alternating current dynamo-electric machines of the synchronous type which simulate in their operation monocyclic networks to effect transformation of constant voltage alternating current into alternating current of constant value, or vice versa. Each of the dynamo-electric machines comprises an armature winding which is connected to the constant voltage alternating current circuit and the constant current alternating current circuit, and a field winding which is variably energized in order that the respective machines operate in effect as a linear inductance and capacitance to simulate the action of the static impedances of a monocyclic network. In order variably to energize the field windings by the transmission of variable unidirectional currents thereto so that the armature currents of the machines vary in a linear manner with respect to their applied armature voltages, I employ excitation circuits for the field windings which are responsive to the respective armature voltages. The excitation circuits comprise rectifiers which are energized in accordance with the armature voltages and include means for varying the reactive currents produced by the various machines, in this manner providing a means which permits the control or adjustment of the value of the current which is maintained in the constant current alternating current circuit. One of the dynamo-electric machines is overexcited so that that machine draws a leading current from the system, and the other machine is underexcited so that the latter machine draws a lagging current from the system. In this manner, the overexcited machine operates in effect as a capacitance and the underexcited machine operates in effect as a linear inductance.

In accordance with another feature of several of the illustrated embodiments of my invention, I provide means comprising a pair of alternating current dynamo-electric machines of the synchronous type which supplement the operation of a monocyclic network which is connected between a constant voltage alternating current circuit and a constant current alternating current circuit. One of the machines is overexcited and the other machine is underexcited and these machines transmit variable amounts of reactive leading and lagging volt-amperes to the monocyclic network, thereby increasing the capacity of the transforming apparatus. The dynamo-electric machines may be connected to the monocyclic network by employing transformers connected in series relation with the inductances and capacitances of the network. The underexcited machine is connected to the transformers associated with the inductances and the overexcited machine is connected to the transformers associated with the capacitances. In a still further modification of my invention, the transformers may be connected in parallel relation with the inductances and the capacitances of the monocyclic network.

In accordance with a still further feature of my invention shown in one of the illustrated embodiments, the energization of the field windings of the machines may be controlled in accordance with the armature current of the associated machine, so that the excitation of the machine is varied in a manner to maintain a linear relation between the armature current and the armature voltage.

For a better understanding of my invention, reference may be had to the following description, taken in connection with the accompanying drawings, and its scope will be pointed out in the appended claims.

Figure 1:
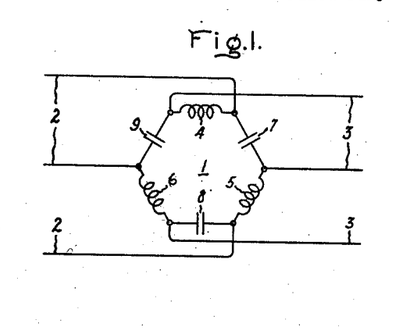
Figs. 1 and 2 represent simplified circuit diagrams concerning monocyclic networks.

In Fig. 1 of the accompanying drawings there is diagrammatically illustrated a monocyclic network 1 for effecting transformation of constant voltage alternating current into alternating current of constant value, or vice versa. The monocyclic network 1 is connected between a constant voltage alternating current circuit 2 and a constant current alternating current circuit 3. The monocyclic network 1 comprises a plurality of branches of serially connected reactances of opposite sign, such as inductances 4, 5, and 6, and capacitances 7, 8, and 9, respectively. The operation of such a monocyclic network in constant voltage-constant current transformation is well understood by those skilled in the art.

Figure 2:
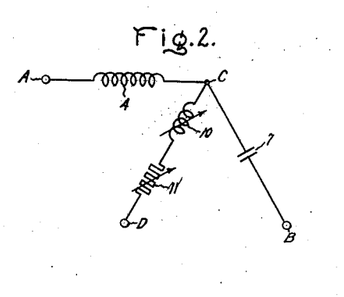

Fig. 2 is a simplified circuit diagram of one of the branches of the monocyclic network including inductance 4 and capacitance 7. For the purposes of explanation in connection with a single phase arrangement, the constant voltage alternating current circuit may be considered as applied to terminals A and B, and the constant current output circuit may be considered as defined by the points C and D. The elements 10 and 11 are employed to represent the load impedance which is energized by constant current. The vector representing the constant current supplied by such a system is always maintained at right angles to the vector representing the voltage applied between terminals A and B.

In operation, the monocyclic circuit varies the voltage impressed across the terminals C and D to maintain constant current through the elements 10 and 11, irrespective of the impedance thereof. This action is well understood by those skilled in the art.

Figure 3:
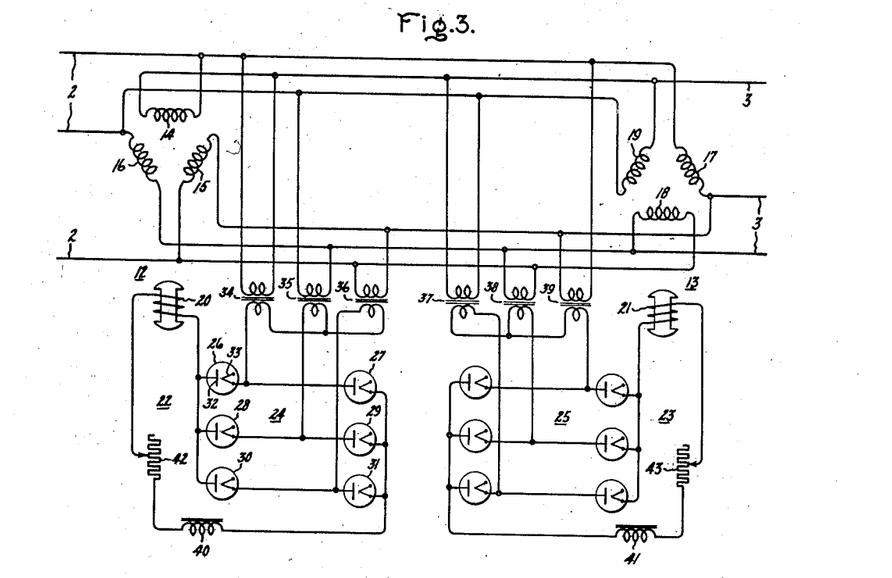
Fig. 3 diagrammatically illustrates an embodiment of my invention as applied to a transforming means employing underexcited and overexcited alternating current dynamo-electric machines of the synchronous type for effecting constant voltage alternating current transformation.

Fig. 3 diagrammatically illustrates an embodiment of my invention as applied to a system for transmitting power between a constant voltage alternating current circuit 2 and a constant current alternating current circuit 3. I provide a pair of alternating current dynamo-electric machines 12 and 13 which are excited to operate in effect as a monocyclic network to transform constant voltage alternating current into alternating current of constant value, or vice versa. One of the machines as, for example, machine 12, is underexcited to operate as a linear inductance and the other machine 13 is overexcited to operate as a capacitance. Dynamo-electric machines 12 and 13 are provided with armature phase windings 14, 15 and 16, and 17, 18, and 19, respectively. Machines 12 and 13 are also provided with excitation or field windings 20 and 21 respectively. The respective stator windings of machines 12 and 13 are connected alternately in a closed series network so that the respective windings operate in effect as serially connected inductances and capacitances.

As a means for supplying unidirectional current to the field windings 20 and 21, I provide excitation circuits 22 and 23 respectively. The excitation circuits 22 and 23 transmit variable amounts of unidirectional current to the field windings 20 and 21. I may employ any suitable arrangement for supplying unidirectional current to the field windings 20 and 21 and for the purpose of illustration I employ rectifiers 24 and 25 which are connected in excitation circuits 22 and 23, respectively. The rectifying circuits 24 and 25 may be of the full-wave type and may comprise electric valves 26—31, inclusive. The electric valves 26—31, inclusive, are preferably of the type employing an ionizable medium, such as a gas or a vapor, and each includes an anode 32 and a cathode 33. To control the energization of the field windings 20 and 21 in accordance with the armature voltage of the associated machine, in order that the armature currents vary in a linear manner with respect to the armature voltages, I provide suitable means such as transformers 34, 35 and 36, and 37, 38 and 39 which are associated with machines 12 and 13, respectively, and which are connected to the armature windings 14, 15 and 16, and 17, 18, and 19, respectively. The transformers 34—36 and 37—39 control the voltages impressed upon the input circuits of rectifiers 24 and 25, respectively, and thereby control the field currents of machines 12 and 13 in accordance with the armature voltages of these machines. Inductances 40 and 41 may be connected in the rectifier output circuits to act as smoothing reactances. As a means for controlling the energization of the field windings 20 and 21 and hence as a means for controlling the effective impedance of the armature windings of machines 12 and 13, and to control thereby the value of the current of the constant current circuit 3, I provide any suitable arrangement such as variable impedances or variable resistances 42 and 43 which are connected in the excitation circuits 22 and 23, respectively.

It is to be understood that I may employ a single alternating current generator of the synchronous type in a circuit for transforming constant voltage alternating current into alternating current of constant value, or vice versa. For example, I could employ either an underexcited or an overexcited alternating current machine of the synchronous type in a system such as that disclosed in Fig. 1 to replace either the inductances or the capacitances. Of course, in such an arrangement the machine is preferably excited so that the armature current of the machine varies in a linear manner with respect to the armature voltage.

The operation of the embodiment of my invention shown in Fig. 3 will be explained by considering the system when the dynamo-electric machines 12 and 13 are operating to transform constant voltage alternating current into alternating current of constant value to transmit power between the constant voltage circuit 2 and the constant current circuit 3. Let it be assumed that field winding 20 of machine 12 is energized so that machine 12 is underexcited, that is, so that it draws lagging reactive current from the constant voltage alternating current circuit 2. Furthermore, let it be assumed that the field winding 21 of the machine 13 is energized so that machine 13 operates as an overexcited machine, that is, so that machine 13 draws a leading reactive current from the constant voltage alternating current circuit 2. Due to the fact that the field windings 20 and 21 are each energized in accordance with the armature voltage of the associated machine, the armature currents conducted by the armature windings 14—19 will vary in a linear manner with respect to the voltage of the constant voltage alternating current circuit 2. This feature is important inasmuch as it is desired that the value of the current of the constant current circuit 3 vary directly and linearly as the magnitude of the voltage of the constant voltage circuit 2. Were the field windings 20 and 21 not energized in this manner, the armature currents would vary in a non-linear manner, thereby disturbing the desired constant voltage-constant current transformation which is desired. The dynamo-electric machine 12 in its operation simulates the action of the inductances 4, 5, and 6 of the monocyclic network shown in Fig. 1, and the dynamo-electric machine 13 simulates in operation the action of the capacitances 7, 8, and 9 of Fig. 1.

Considered in a different manner, the excitation of the machines 12 and 13 may be treated as varying the effective impedance of the armature windings 14—19 of machines 12 and 13. By adjusting the resistances 42 and 43 in excitation circuits 22 and 23, I may control the value of the current which is maintained in the constant current circuit 3.

Figure 4:
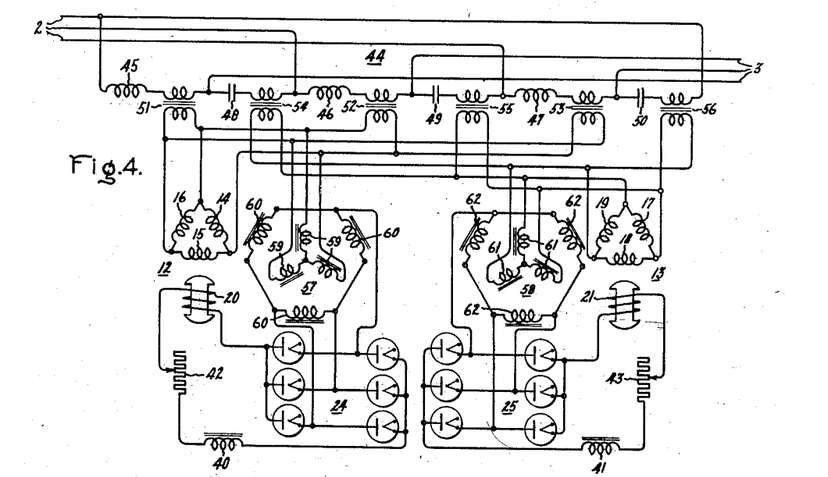
Figs. 4 and 5 diagrammatically illustrate embodiments of my invention in which overexcited and underexcited alternating current generators supplement the operation of a monocyclic network in a constant voltage-constant current transforming arrangement.

In Fig. 4 there is diagrammatically illustrated another embodiment of my invention which is similar in many respects to the arrangement shown in Fig. 3, and corresponding elements have been assigned like reference numerals. The dynamo-electric machines 12 and 13 are operated to transmit variable amounts of leading and lagging reactive volt-amperes and to supplement the operation of a monocyclic network 44 which is connected between the constant voltage alternating current circuit 2 and the constant current alternating current circuit 3. The monocyclic network 44 includes a plurality of branches of serially connected inductances 45, 46 and 47, and capacitances 48, 49 and 50, respectively. The inductive and capacitive elements of the branches of the monocyclic network 44 include transformers 51, 52, and 53, and transformers 54, 55, and 56, respectively. These transformers supply to the inductive elements and to the capacitive elements lagging and leading reactive volt-amperes respectively to supplement the action of the monocyclic network. The transformers 51—53, which are associated with the inductances 45—47, are energized from the underexcited dynamo-electric machine 12, and the transformers 54—56, inclusive, which are associated with the capacitances 48—50, are energized from the overexcited machine 13.

The energization of the field windings 20 and 21 is controlled in accordance with the armature voltages of the respective machines by employing transformers 57 and 58. Transformer 57 includes primary winding 59 and secondary windings 60. Transformer 58 includes primary winding 61 and secondary windings 62.

The embodiment of my invention shown in Fig. 4 operates to transform constant voltage alternating current into alternating current of constant value. The dynamo-electric machines 12 and 13 supplements the action of the monocyclic network 44 to produce or generate lagging and leading reactive volt-amperes. Because the current transmitted to the field windings 20 and 21, and hence the excitation of machines 12 and 13 are varied in accordance with the armature voltages of the respective machines, the transformers 51—56 introduce into the monocyclic network 44 reactive volt-amperes. The machines 12 and 13 operate in effect as linear inductances and capacitances, respectively. Another important feature of the embodiment of my invention shown in Fig. 4 is that relating to the facility with which the system may be adjusted with respect to other monocyclic networks with which it may be associated. By varying the field excitation of machines 12 and 13, the network 44 and associated equipment may be made to operate with other monocyclic networks of different characteristics. Furthermore, the flexibility of the system adapts it readily to control the load transmitted by the system; that is, it permits load adjustment or adjustment of the current maintained in the constant current circuit 3. In addition, the flexibility of control incident to the variation in excitation of the machines 12 and 13 makes it possible to maintain the system in resonance at slightly different frequencies.

If desired, I may employ a single alternating current dynamo-electric machine of the synchronous type in connection with a monocyclic network to supplement the operation of the monocyclic network. For example, I could employ a single dynamo-electric machine, either overexcited or underexcited, to supplement the operation of the monocyclic network by transmitting thereto leading or lagging reactive volt-amperes. Furthermore, by controlling the current transmitted to the field winding of a single machine so employed, the machine may be changed from an underexcited condition to an overexcited condition, or vice versa, to change the reactive volt-amperes supplied to the monocyclic network from a lagging to a leading relationship. In this manner the effective impedances of the branches of the monocyclic network may be varied throughout a substantial range by employing a machine of relatively small size or rating.

As a further matter, it is to be understood that the machines 12 and 13, when operating to supplement the action of the monocyclic network 44, may be varied throughout the underexcited and the overexcited regions to increase the range of control of the effective impedance of the monocyclic network 44 and thereby control the value of current which is maintained in the constant current circuit 3. For example, the excitation of machine 12 may be changed so that it operates as an overexcited synchronous machine, and the excitation of the machine 13 may be varied so that it operates as an underexcited machine. In this manner, the load control available is materially increased without increasing the ratings of the machines 12 and 13 and without increasing the size or rating of the elements of the monocyclic network.

Figure 5:
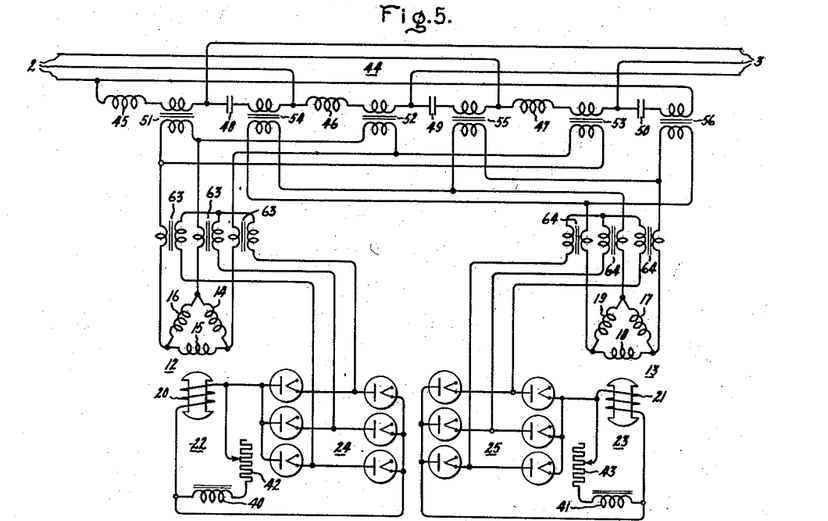

Fig. 5 diagrammatically represents another embodiment of my invention which is similar in many respects to the arrangement of Fig. 4, and corresponding elements have been assigned like reference numerals. In the arrangement of Fig. 5, the excitation of the machines 12 and 13 is varied in accordance with the armature current conducted by the respective machines so that the amature current varies in a linear manner. Transformers 63 are connected to be energized in accordance with the armature current of machine 12 and impress variable voltage on rectifier 24 so that the direct current transmitted to field winding 20 varies in accordance with the armature current. The smoothing inductance 40 and the resistance 42 may be connected in parallel relation with the output circuit of the rectifier 24. Similarly, transformers 64 are connected to be energized in accordance with the armature current of machine 13 and impress a variable voltage on the input terminals of rectifier 25 so that the unidirectional current transmitted to field winding 21 varies in a manner to maintain a linear relation between the armature voltage and the current.

The arrangement of Fig. 5 operates in substantially the same manner as that described above in connection with Fig. 4. The machine 12 operates in effect as a linear inductance generating variable amounts of lagging reactive volt-amperes. The machine 13, which of course is overexcited, generates variable amounts of leading reactive volt-amperes.

Figure 6:
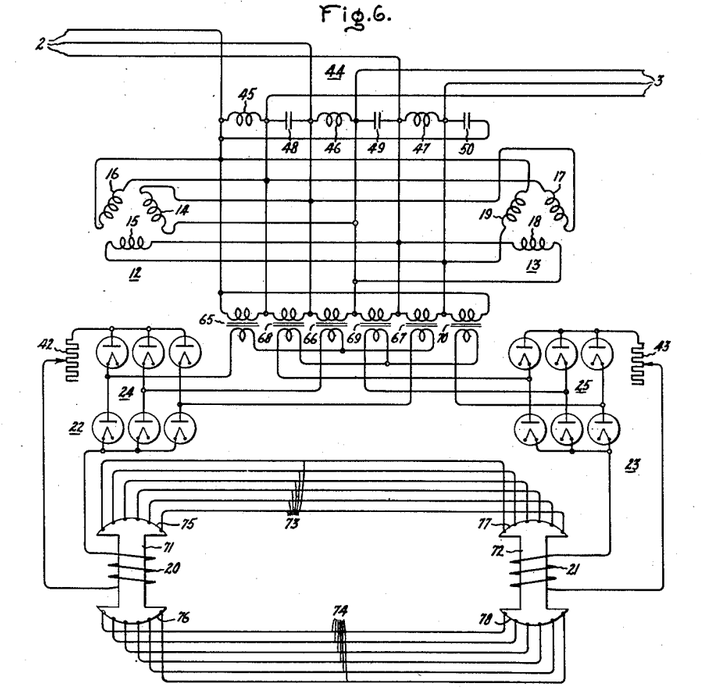
Fig. 6 diagrammatically represents another embodiment of my invention in which underexcited and overexcited synchronous machines supplement the operation of a monocyclic network and in which the field structures of the machines are provided with amortisseur windings.

A still further embodiment of my invention is diagrammatically illustrated in Fig. 6. Certain elements of the arrangement shown in Fig. 6 are the same as those shown in Figs. 4 and 5 and have been assigned like reference numerals. In the arrangement of Fig. 6, the dynamo-electric machines 12 and 13 transmit variable amounts of lagging and leading reactive volt-amperes to the monocyclic network 44 by means of transformers 65—67 and 68—70, which are associated with inductances 45—47, and capacitances 48—50 respectively.

The machines 12 and 13 are provided with field structures 71 and 72, respectively. In order to permit rapid changes in the constant-current voltage and to resist sudden changes in the voltage of the constant-voltage circuit, I provide amortisseur windings 73 and 74 which, of course, are embedded in the pole faces 75, 76 and 77, 78 of the pole structures 71 and 72, respectively. These amortisseur windings are interconnected in a suitable manner, such as that shown in the drawings, and serve as a means for permitting rapid changes in the constant-current voltage and at the same time prohibit or resist rapid changes in the voltage of the constant voltage circuit. Of course, since the pole structures 71 and 72 are not mechanically coupled, the windings 73 and 74 may be connected through suitable means such as slip rings and brushes.

Figure 7:
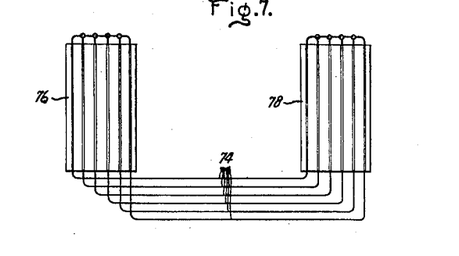
Fig. 7 represents additional features of the arrangement shown in Fig. 6.

Fig. 7 shows somewhat in detail the pole faces 76 and 78 of the pole structures 71 and 72, respectively, and a manner in which the amortisseur winding 74 may be embedded in the surface of the pole faces and a manner in which the winding may be spaced.

The embodiment of my invention shown in Fig. 6 operates in substantially the same manner as that explained above in connection with Figs. 4 and 5. Machine 12 is under-excited and machine 13 is overexcited so that these machines produce lagging reactive volt-amperes and leading reactive volt-amperes, respectively. The machines 12 and 13 transmit the reactive volt-amperes through transformers 65—70 to the monocyclic network 44. Due to the presence of the amortisseur windings 73 and 74, the arrangement of Fig. 6 permits rapid changes in the constant-current voltage so that the system responds to permit variable load conditions in a rapid and precise manner. Furthermore, the presence of the amortisseur windings 73 and 74 tends to resist changes in the voltage of the constant-voltage circuit, thereby tending to stabilize the operation of the system.

Figure 8:
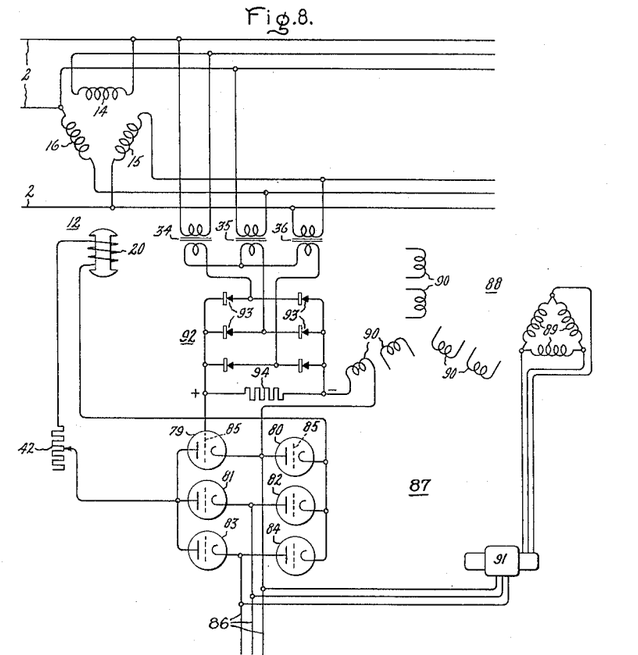
Fig. 8 represents diagrammatically another embodiment of my invention employing an electric valve of the controlled type for controlling the energization of a field winding of a synchronous machine used as an element in a monocyclic network.

Fig. 8 diagrammatically illustrates another modification of my invention and is similar in many respects to the arrangement shown in Fig. 3 and corresponding elements have been assigned like reference numerals. In the arrangement of Fig. 8, I provide a plurality of electric valve means 79—84 of the controlled type. These valves are preferably of the type employing an ionizable medium, such as a gas or a vapor, and each includes a control member 85 which renders the electric valve means conductive. The system has been shown as applied to only one of the dynamo-electric machines of the system as, for example, dynamo-electric machine 12. It is to be understood that a similar system or control circuit may be associated with the machine 13 in a general system such as that shown in Fig. 3 or in the other embodiments of the invention shown and discussed hereinbefore. The electric valve means 79—84 may be employed as power valves for transmitting variable amounts of unidirectional current to the field winding 20 from a constant voltage alternating current source 86, or the electric valve means may be employed as devices for controlling the energization of associated power means which transmits the undirectional current to the field winding 20. To control the conductivities of the electric valve means 79—84 in accordance with a predetermined controlling influence, such as the armature or stator voltage of machine 12, in order that the machine may operate as a linear inductance, I provide a control circuit 87 comprising a transformer 88 having primary windings 89 and secondary windings 90. To adjust the phase of the alternating voltages of windings 90 relative to the anode-cathode voltages of the electric valve means 79—84, I employ any suitable phase shifting arrangement, such as a rotary phase shifter 91, which may be energized from any suitable source of alternating voltage correlated in phase and frequency with respect to the voltage of the circuit 86, and in Fig. 8 is shown as being connected to the alternating current circuit 86. As a means for varying the resultant voltage impressed on the control members 85 in response to the stator voltages of machine 12, I provide a rectifier 92, which may be of the full-wave type, comprising a plurality of undirection conducting devices 93 which are energized from the output circuits of potential transformers 34—36. The output voltage of the rectifier 92 is impressed across a resistance 94 which in turn impresses a variable positive unidirectional potential on the control members 85. While only one of the secondary windings 90 of the transformer 88 is shown as being connected to the electric valves, it is to be understood that the other windings may be connected in a similar manner with the resistance 94, so that there is impressed on each control member a voltage which is the resultant of an alternating component produced by the secondary windings 90 and a unidirectional component which is produced by the resistance 94.

Figure 9:
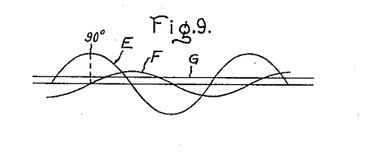
Figs. 9 and 10 represent certain operating characteristics thereof.
Figure 10:
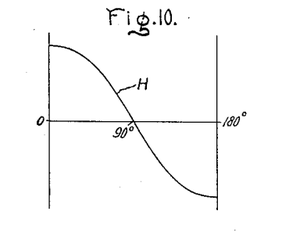

The control circuit 87 of Fig. 8 operates to control the conductivities of electric valves 79—84 so that a variable unidirectional current is transmitted to field winding 20 to control the machine 12 in a manner to simulate the operation of a linear inductance. Of course, the control circuit 87 may be applied to a machine which is overexcited and which simulates the operation of a capacitance. The operation of the control circuit 87 may be better understood by referring to the operating characteristics shown in Figs. 9 and 10. Curve E of Fig. 9 represents the anode-cathode voltage of one of the electric valves, such as electric valve 79, and curve F represents the alternating component of voltage impressed on the associated control member 85 by the connected secondary winding 90 of transformer 88. Line G represents the variable positive unidirectional potential impressed on the control members 85 by means of the rectifier 92 and the resistance 94. It will be understood that as the magnitude of the unidirection biasing voltage varies, the time at which the electric valve means is rendered conductive during the positive half cycles of applied anode-cathode voltage is also varied to control the average value of current transmitted to the field winding 20. In order to obtain satisfactory control of the electric valve means and to obtain a linear response of the machine 12, it is preferable to adjust the rotary phase shifter 91 so that the alternating components of voltage impressed on control members 85 are displaced substantially 90 electrical degrees in the lagging direction with respect to the applied anode-cathode voltages. The desirability of such an adjustment will be understood by observing curve H of Fig. 10 which represents the average or output current of a controlled rectifier for various lagging phase displacements between the anode-cathode voltage and the voltage impressed on the control member. It is seen that the rate of change of the output characteristic is maximum at the 90 electrical degree displacement point, and accurate and quick response may be obtained by operating within the region nearest that point.

Figure 11:
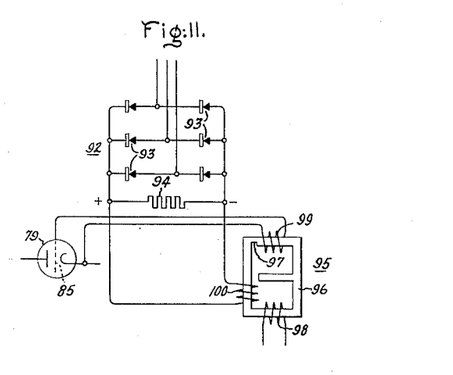
Fig. 11 is a modification of the arrangement shown in Fig. 8.

In Fig. 11 there is shown a modification of the arrangement of Fig. 1 which includes a saturable inductive device 95 which impresses on the control member 85 an alternating voltage of peaked wave form which is variable in phase with respect to the applied anode-cathode voltage. It is to be understood that I employ a plurality of such devices for energizing all the control members of electric valves 79—84. The saturable inductive device 95 includes a core member 96 having a restricted saturable portion 97, a primary winding 98 which may be energized from the rotary phase shifter 91 of Fig. 8, a secondary winding 99 in which there is induced an alternating voltage of peaked wave form and a control winding 100 through which there is transmitted variable amounts of unidirectional current derived from the rectifier 92 and the resistance 94. The phase of the voltage of peaked wave form impressed on the control member 85 varies in accordance with the output voltage of rectifier 92 to control the conductivities of the electric valves so that machine 12 operates substantially as a linear inductance. Of course, such a system may be employed with machines which are underexcited or overexcited.

While the embodiments of my invention shown in Figs. 8 and 9 have been described in connection with systems which are responsive to the voltages of the stator windings, it is to be understood that they may be applied to systems, such as that shown in Fig. 5, in which the control voltage is responsive to the armature currents. Furthermore, the modifications of Figs. 8 and 9 may be applied to arrangements such as that shown in Figs. 4, 5, and 6 in which the dynamo-electric machines supplement the operation of a monocyclic network.

While I have shown and described my invention as applied to particular systems of connections and as embodying various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a constant voltage alternating current circuit, a constant current alternating current circuit, a pair of alternating current dynamo-electric machines of the synchronous type each being provided with an armature winding and a field winding, means for exciting the field winding of one of said machines so that said one machine draws leading current simulating the characteristics of a capacitance, and means for exciting the field winding of the other of said machines so that said other machine draws a lagging current simulating the characteristics of a linear inductance, said machines acting conjointly to effect constant voltage-constant current transformation.

2. In combination, a constant voltage alternating current circuit, a constant current alternating current circuit, means connected between said circuits for transforming constant voltage alternating current to alternating current of constant value and comprising a pair of dynamo-electric machines of the synchronous type each having an armature winding and a field winding, and means for energizing said field windings so that one of said machines operates as an overexcited synchronous machine and so that the other operates as an underexcited synchronous machine.

3. In combination, a constant voltage alternating current circuit, a constant current alternating current circuit, a pair of alternating current dynamo-electric machines of the synchronous type each being provided with an armature winding and a field winding, said armature windings being connected to said constant voltage alternating current circuit and to said constant current alternating current circuit, and means for energizing the field windings of said machines in accordance with the voltage impressed across said armature windings so that one of said machines draws a leading current and the other machine draws a lagging current.

4. In combination, a constant voltage alternating current circuit, a constant current alternating current circuit, a pair of alternating current dynamo-electric machines of the synchronous type each being provided with an armature winding and a field winding, the armature windings being connected to said constant voltage and said constant current alternating current circuits, and means for controlling the energization of the field windings so that the armature currents of said machines vary linearly with respect to the voltage of said constant voltage alternating current circuit.

5. In combination, a constant voltage alternating current circuit, a constant current alternating current circuit, means for transforming constant voltage alternating current to alternating current of constant value and comprising a pair of alternating current dynamo-electric machines of the synchronous type each having an armature winding and a field winding, the armature windings being connected to said constant voltage and said constant current circuits, and means responsive to the voltage impressed on said armature windings for controlling the energization of said field winding so that one of said machines operates in effect as a linear inductance and the other machine operates in effect as a capacitance.

6. In combination, a constant voltage alternating current circuit, a constant current alternating current circuit, means for transforming constant voltage alternating current into alternating current of constant value and comprising a pair of alternating current dynamo-electric machines of the synchronous type, each of said machines being provided with an armature winding and a field winding, and means for controlling the energization of said machines so that one of said machines operates as a linear inductance and the other machine operates as a capacitance and comprising rectifying means energized in accordance with the voltage of said armature windings for supplying unidirectional current to said field windings.

7. In combination, a constant voltage alternating current circuit, a constant current alternating current circuit, means for transforming constant voltage alternating current into alternating current of constant value and comprising a pair of alternating current dynamo-electric machines of the synchronous type each having an armature winding and a field winding, the armature windings being connected to said constant voltage and said constant current circuits, electric valve means responsive to the voltage impressed on said armature windings for varying the energization thereof so that one of said machines operates in effect as a linear inductance and the other machine operates in effect as a capacitance, and means for controlling the current transmitted to the field windings to control the effective impedance of said armature windings.

8. In combination, a constant voltage alternating current circuit, a constant current alternating current circuit, means for transforming constant voltage alternating current into alternating current of constant value and comprising a pair of alternating current dynamo-electric machines of the synchronous type each having an armature winding connected to said circuits and having a field winding, a pair of excitation circuits for energizing the field windings so that one of said machines operates as an underexcited synchronous machine and the other machine operates as an overexcited synchronous machine, and means for controlling the energization of the field windings to control the value of the current in said constant current circuit.

9. A monocyclic network for transforming constant voltage alternating current to alternating current of constant value comprising a dynamo-electric machine operated with a lagging power factor and a dynamo-electric machine operated with a leading power factor, said dynamo-electric machines each having a stator winding and having the respective stator windings connected alternately in a closed series network, and means for controlling the excitation of said dynamo-electric machines in accordance with an electrical characteristic of the constant voltage side of said network.

10. A polyphase monocyclic network for transforming constant voltage alternating current to alternating current of constant value comprising a polyphase dynamo-electric machine operated at substantially zero power factor lagging and a polyphase dynamo-electric machine operated at substantially zero power factor leading, said dynamo-electric machines each having windings displaced in phase and having the corresponding phase windings of the respective machines connected alternately in a series network, and means responsive to an electrical characteristic of the constant voltage side of said network for controlling the excitation of said dynamo-electric machines.

11. In combination, a constant voltage alternating current circuit, a constant current alternating current circuit, means for transforming constant voltage alternating current into alternating current of constant value comprising a monocyclic network including a plurality of branches of serially connected inductances and capacitances, and a pair of alternating current dynamo-electric machines of the synchronous type having armature windings connected to said monocyclic network to control the effective impedance thereof.

12. In combination, a constant voltage alternating current circuit, a constant current alternating current circuit, a monocyclic network connected between said circuits and comprising a plurality of branches of serially connected reactances of opposite sign for transforming constant voltage alternating current into alternating current of constant value, and a pair of alternating current dynamo-electric machines of the synchronous type for supplementing the monocyclic network by supplying variable amounts of leading and lagging reactive volt-amperes to the monocyclic network.

13. In combination, a constant voltage alternating current circuit, a constant current alternating current circuit, means connected between said circuits comprising a serially connected inductance and a capacitance for transforming constant voltage alternating current into alternating current of constant value, and means for controlling the reactive current of said inductance and said capacitance comprising an underexcited alternating current dynamo-electric machine of the synchronous type associated with said inductance and an overexcited dynamo-electric machine of the synchronous type associated with said capacitance.

14. In combination, a constant voltage alternating current circuit, a constant current alternating current circuit, a monocyclic network connected between said circuits and comprising a plurality of branches of serially connected inductances and capacitances for transforming constant voltage alternating current into alternating current of constant value, individual means connected in series relation with each of said inductances and said capacitances for controlling the reactive current transmitted by the respective associated branches of the monocyclic network, an underexcited alternating current dynamo-electric machine of the synchronous type for energizing the last mentioned means associated with said inductances, and an overexcited alternating current dynamo-electric machine of the synchronous type for energizing the last mentioned means associated with said capacitances.

15. In combination, a constant voltage alternating current circuit, a constant current alternating current circuit, means for transforming constant voltage alternating current into alternating current of constant value comprising a monocyclic network including a plurality of branches of serially connected inductances and capacitances, a pair of alternating current dynamo-electric machines of the synchronous type having armature windings connected to said monocyclic network to control the effective impedance thereof, said machines each being provided wtih a field winding, and means for controlling the excitation of the field windings in accordance with the voltage of the associated armature winding.

16. In combination, a constant voltage alternating current circuit, a constant current alternating current circuit, means for transforming constant voltage alternating current into alternating current of constant value and comprising a monocyclic network including a plurality of branches of serially connected inductive and capacitive elements, an underexcited alternating current dynamo-electric machine of the synchronous type for controlling the effective impedance of said inductive elements, an overexcited alternating current dynamo-electric machine of the synchronous type for controlling the effective impedance of said capacitive elements, said machines each being provided with a field winding, means for controlling the energization of the field winding of the underexcited machine in accordance with a voltage derived from said inductive elements, and means for controlling the energization of the field winding of said overexcited machine in accordance with a voltage derived from said capacitive elements.

17. In combination, a constant voltage alternating current circuit, a constant current alternating current circuit, a monocyclic network connected between said circuits for transforming constant voltage alternating current into alternating current of constant value and comprising a plurality of branches of serially connected inductances and capacitances, transformers connected in series relation with said inductances and said capacitances, and means for transmitting reactive volt-amperes to said transformers to supplement the operation of said monocyclic network and comprising a pair of alternating current dynamo-electric machines of the synchronous type, means for overexciting one of said machines, and means for underexciting the other of said machines, the underexcited machine being connected to the transformers associated with the inductances and the overexcited machine being connected to said transformers associated with the capacitances.

18. In combination, a constant voltage alternating current circuit, a constant current alternating current circuit, a monocyclic network connected between said circuits and comprising a plurality of branches of serially connected inductances and capacitances, a plurality of transformers connected in parallel relation with said inductances and said capacitances, a pair of alternating current dynamo-electric machines of the synchronous type each having a field winding, means for energizing the field winding of one of said machines to underexcite said machine, means for energizing the field winding of the other machine to overexcite said machine, the underexcited machine being connected to the transformers connected in parallel with the inductances for supplying lagging reactive volt-amperes to said monocyclic network and the overexcited machine being connected to the transformers connected in parallel with the capacitances to supply leading reactive volt-amperes to said monocyclic network.

19. In combination, a constant voltage alternating current circuit, a constant current alternating current circuit, means connected between said circuits for transforming constant voltage alternating current into alternating current of constant value comprising a pair of alternating current dynamo-electric machines of the synchronous type each having an armature winding and a field winding, and means for energizing the respective field windings in accordance with the armature current of the associated machine so that one of said machines absorbs lagging reactive volt-amperes and the other machine absorbs leading reactive volt-amperes.

20. In combination, a constant voltage alternating current circuit, a constant current alternating current circuit, means connected between said circuits for transforming constant voltage alternating current into alternating current of constant value and comprising a monocyclic network including a plurality of branches of serially connected inductances and capacitances, means for supplementing the operation of the monocyclic network by supplying variable amounts of reactive volt-amperes to the monocyclic network and comprising a pair of alternating current dynamo-electric machines of the synchronous type each being provided with an armature winding and a field winding, one of said machines being overexcited and the other machine being underexcited, and means responsive to the armature current of the respective machines for energizing the associated field winding.

21. In combination, a constant voltage alternating current circuit, a constant current alternating current circuit, means connected between said circuits for transforming constant voltage alternating current into alternating current of constant value and comprising a pair of alternating current dynamo-electric machines of the synchronous type each being provided with an armature winding and a field winding, said machines being electrically interconnected, and means associated with the field windings of said machines to permit rapid changes in the constant-current voltage.

22. In combination, a constant voltage alternating current circuit, a constant current alternating current circuit, means connected between said circuits for transforming constant voltage alternating current into alternating current of constant value and comprising a pair of alternating current dynamo-electric machines of the synchronous type each being provided with an armature winding which is connected to said circuits, a field winding and an amortisseur winding, and means for controlling the energization of the field windings.

23. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and having a field winding, and means for controlling the energization of said field winding so that said machine operates either as a linear inductance or as a capacitance.

24. In combination, a constant voltage alternating current circuit, a constant current alternating current circuit, means connected between said circuits for transforming constant voltage alternating current into alternating current of constant value and comprising serially connected reactances of opposite sign, an underexcited alternating current dynamo-electric machine associated with one of the reactances for transmitting lagging reactive volt-amperes to said monocyclic network, and an overexcited alternating current dynamo-electric machine of the synchronous type associated with the other reactance for transmitting leading reactive volt-amperes to said monocyclic network.

25. In combination, a constant voltage alternating current circuit, a constant current alternating current circuit, means connected between said circuits for transforming constant voltage alternating current into alternating current of constant value and comprising a monocyclic network including serially connected reactances of opposite sign, means for controlling the effective impedance of said monocyclic network to control the value of the current transmitted to said constant current circuit and comprising an underexcited alternating curent dynamo-electric machine of the synchronous type associated with reactances of one sign and an overexcited alternating current dynamo-electric machine of the synchronous type associated with the reactances of opposite sign, and means for controlling the excitation of said machines in accordance with the respective armature voltages.

26. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and a field winding, and means for transmitting variable amounts of unidirectional current to said field winding in accordance with an electrical condition of said machine so that said machine operates either as a linear inductance or as a capacitance.

27. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and having a field winding, means for transmitting variable amounts of unidirectional current to said field winding in accordance with an electrical condition of said machine so that said machine operates either as a linear inductance or as a capacitance, and means for adjusting the excitation of said machine to control the value of current which is maintained in said constant current alternating. current circuit.

28. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and a field winding, and means for transmitting variable amounts of unidirectional current to said field winding in accordance with an electrical condition of said machine so that said machine operates either as a linear inductance or as a capacitance and comprising an electric valve means of the controlled type having a control member and means for impressing on said control member a potential which varies in accordance with said electrical condition.

29. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and a field winding, a source of substantially constant alternating voltage, and means connected between said source and said field winding for transmitting thereto variable amounts of unidirectional current in accordance with an electrical condition of said machine so that said machine operates either as a linear inductance or as a capacitance and comprising an electric valve means having a control member for controlling the conductivity thereof and means for impressing on said control member a voltage which varies in accordance with said electrical condition.

30. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and a field winding, means for transmitting variable amounts of unidirectional current to said field winding and comprising an electric valve means having an anode, a cathode and a control member, means for impressing on said control member an alternating voltage which lags the anode-cathode voltage by substantially ninety electrical degrees, and means for superimposing on said alternating voltage a variable unidirectional voltage which varies in accordance with an electrical condition of said machine.

31. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and a field winding, a source of alternating voltage of substantially constant value, an electric valve means connected between said field winding and said source and comprising an anode, a cathode and a control member, and means for impressing on said control member a periodic voltage adjustable in phase with respect to the anode-cathode voltage to control the excitation of said machine so that it simulates the operation of a linear inductance or a linear capacitance.

32. In combination, a constant voltage alternating current circuit, a constant current alternating current circuit, apparatus connected between said circuits for transforming constant voltage alternating current into alternating current of constant value and comprising an alternating current dynamo-electric machine of the synchronous type having an armature winding and a field winding, a source of alternating voltage of substantially constant value, an electric valve means connected between said field winding and said source and comprising an anode, a cathode and a control member, and means comprising a saturable inductive device for impressing on said control member a periodic voltage of peaked wave form variable in phase with respect to the anode-cathode voltage of said electric valve to transmit variable amounts of unidirectional current to said field winding in accordance with an electrical condition of said machine.

BURNICE D. BEDFORD.